Oct. 24, 1967  S. H. BIELAK  3,348,305
CAN OPENER

Filed Jan. 10, 1966  7 Sheets-Sheet 2

Inventor:
Sigmund H. Bielak
By George R. Clark
Atty

Oct. 24, 1967 S. H. BIELAK 3,348,305
CAN OPENER
Filed Jan. 10, 1966 7 Sheets-Sheet 3

Fig. 4.

Inventor:
Sigmund H. Bielak
By George R. Clark
Atty

Inventor:
Sigmund H. Bielak
By George R. Clark
Atty

3,348,305
CAN OPENER
Sigmund H. Bielak, Downers Grove, Ill., assignor to Sunbeam Corporation, Chicago, Ill., a corporation of Illinois
Filed Jan. 10, 1966, Ser. No. 519,616
20 Claims. (Cl. 30—4)

This invention relates generally to can openers and more specifically to improvements in can openers adapted to cut the end seam of a can so that the cutting means never contacts the contents of the can during the process of severing the lid from the can. The type of can opener with which the invention is concerned is disclosed and claimed in Jepson et al. Patent No. 3,216,108 which is assigned to the same assignee as the present application.

There are obvious advantages in having a can opened by cutting means which does not enter the interior of the can in which food is contained. The cutting means does not become coated with food, and there is no possibility of the cutter contaminating the food by transferring to it bacteria which might have accumulated on the cutting means. The problem of severing the cover and removing it from the can is made far more complicated when the cut is made in the end seam of the can rather than in the cover portion which is normal to the axis of the can. The end seam of the can under normal circumstances is made up of five layers of metal which are sandwiched together and cemented to seal the cover of the can to the cylindrical side wall. These five layers of metal are cylindrical portions of the cover and side wall interconnected by annular channel-shaped portions as will be described in greater detail below. In Jepson et al. Patent No. 3,216,108 a can opener is disclosed and claimed which severs the cover from the end seam by making an annular cut along the inside diameter of the end seam. At the same time this annular cut is made, the end seam is bent outwardly so that it takes a somewhat conical rather than cylindrical shape. This outward bend makes it possible to remove the cover of the can which, even though severed from the can, would otherwise be trapped in place by the remaining portion of the end seam which is still connected to the can. In cutting the cover from the can in this manner, it is desirable to cut only one layer of metal in the end seam rather than permitting the cutter to penetrate several layers of metal. By cutting a single layer of metal and rolling the end seam outwardly, a smooth edge is left on the upper wall of the can and the cover is easily removed therefrom.

To successfully cut the cover in the manner described above, it is necessary for the cutter to track accurately around the end seam, maintaining a constant distance from the upper edge of the end seam to the point at which the cut is made. If the cutter tends to travel upwardly or downwardly on the end seam, the cover is not severed from the can at the end of a revolution of the can with the cutter engaged therewith. If the cutter does not complete the cut at the same level on the end seam at which it started, an elongated sliver may be produced which will interconnect the can to the end seam. While the cover may be twisted loose from such a sliver, it is annoying and dangerous. Accordingly, it would be desirable to guide the can and the cover in such a way that no sliver would be produced as the cutter completes its rotary engagement with the seam of the can.

Because of the various types of materials and thicknesses of materials used in fabricating cans, a can opener must be designed to accommodate various types of end seams if it is to be suitable for use in the average home. Materials such as cardboard, aluminum, plastic, and steel are commonly used in the fabrication of cans. The type of can opener with which we are presently concerned requires a considerable amount of force to cut and bend the end seam of the can. To apply the proper amount of cutting and bending force to thin aluminum cans as well as thick steel cans, presents a substantial design problem. Actually, the fact that less force is required to sever and bend the thin aluminum end seams as compared to the thicker steel end seams provides a basis for simplifying the design approach while still providing a can opener which will open all the various types of cans satisfactorily.

Another problem which presents itself in connection with this type of can opener is that of loading the can into the mechanism. In the conventional can opener having a cutting blade or wheel extending vertically, the user of the can opener may readily view the serrated can feeding wheel which engages the outer underside of the end seam and the can cutter while the end seam is inserted therebetween. In the present can opener in which a cutting wheel rotatable about a vertical axis is positioned to engage the inside diameter of the end seam, there is a considerable amount of mechanism obstructing the user's view of the can rotating or feeding wheel and the cutter as he attempts to insert the end seam therebetween. Accordingly, the instant invention provides means for facilitating insertion of the can into the loading position in the can opener.

As was mentioned above in connection with the means for controlling the forces applied by the cutting means, there are many different materials which present different problems in opening a can in the manner described above. In the opening of aluminum cans or cans made of soft material, there is a tendency for the high pressures used between the cutter and the feed wheel to cause the cutter to mash the upper edge of the end seam and to slide out of cutting engagement therewith. While the cutter disclosed in the above cited Jepson et al. patent is satisfactory for use in most applications, there are occasions in which the soft can material causes the disengagement described above. Accordingly, it would be desirable to have a can cutter which would function satisfactorily with all types of cans which are encountered in the home today. The present invention utilizes a can cutter which more positively grips the end seam of the can and prevents the type of disengagement described above.

Accordingly, it is an object of the present invention to provide an improved can opener of the type in which the cutter engages the inner diameter of the end seam of the can to sever the cover from the can without the cutter entering into the food containing portion of the can.

It is another object of the present invention to provide a new and improved can opener having means for automatically accommodating can end seams of different dimensions and different materials.

It is a further object of the present invention to provide an improved can opener of the type in which the inner diameter of the end seam is severed and bent outwardly wherein guiding means are provided to maintain constant the distance from the upper edge of the end seam to the location of the engagement by the cutter.

It is a further object of the present invention to provide an improved cover engaging means which prevents slivering of the cover when severed by an annular cut on the inside diameter of the end seam.

Still another object of the present invention is to provide an improved can opener of the type having relatively movable cutter and feed wheels rotatable about parallel axes with said relative movement being in directions parallel to and perpendicular to said axes of rotation.

A further object of the present invention is to provide a new and improved can cutter for a can opener of the type cutting inside on the diameter of the end seam and bending it outwardly to permit removal of the cover.

Further objects and advantages of the present invention will become apparent as the following description proceeds and the features of novelty which characterize the invention will be pointed out with particularity in the claims annexed to and forming a part of this specification.

For better understanding of the present invention, reference may be had to the accompanying drawings in which.

The can opener of the instant invention is similar to the can opener disclosed in Jepson et al. Patent No. 3,216,108 in that it includes a cutting wheel or cutter mounted for rotation about a vertical axis with said cutting wheel being movable horizontally into cutting engagement with the inside diameter of the end seam of a can. The cutting wheel cooperates with a can rotating or feed wheel which engages the outer wall of the can and cooperates with the cutter to rotate the can about a vertical axis during the cutting operation. At the same time the end seam of the can is being cut along the inner diameter, it is being bent outwardly to facilitate the removal of the can cover. The can opener of the instant invention represents an improvement over the can opener of the Jepson et al. patent insofar as means are provided to guide the can and to control the position of the cover so that the cutter will make a single continuous cut producing no slivers when the can is rotated 360°. A guide plate is provided which engages the upper edge of the end seam of the can and causes the can to rotate about an axis which is tilted with respect to the vertical axis so that the can feeds upwardly slightly into the cutter as it is rotated. There is also provided a spring finger which presses downwardly on the cover of the can adjacent to the cutting wheel in order to prevent displacement of the cover immediately prior to the completion of the cutting operation. This prevents the formation of a sliver or an incomplete cut as is normally the result when the cover is displaced at this point in the opening operation.

The invention also includes an improved cutting wheel which eliminates problems of disengagement of the cutting wheel from the end seam when opening cans of soft material such as aluminum. Through the use of a cutting wheel having the cutting edge positioned centrally on a conical surface which cooperates with the cutter to squeeze the end seam of the can therebetween, the end seam is more positively retained between the feed and cutting wheels and disengagement of the cutter is obviated. In addition, the cutting wheel is supported on a resilient slide member which is deformed varying amounts to accommodate can end seams of different thickness.

Another important aspect of the invention involves the mechanism which moves the can feed wheel vertically between a can loading and a can cutting position. Thus, as the can opening process begins, the cutter is moved horizontally toward the feed wheel and the feed wheel is moved vertically along its axis of rotation toward the cutter to place the wheels in position to grip the end seam of the can during the can opening operation. The use of the vertical and horizontal movement of the feed and cutting wheels provides an arrangement in which the wheels are well spaced when in the loading position so that a can may be readily inserted between the wheels.

Referring now to the drawings wherein like reference characters designate corresponding parts throughout the several views, there is shown a power operated can opener generally designated by reference numeral 20. The can opener 20 is provided with a housing 21 which is made up of a front cover portion 22 and a supporting frame 23. The cover portion includes a base 24 which is supported by means of rubber feet 25 which are received in recesses in the base.

Figures 2, 5:
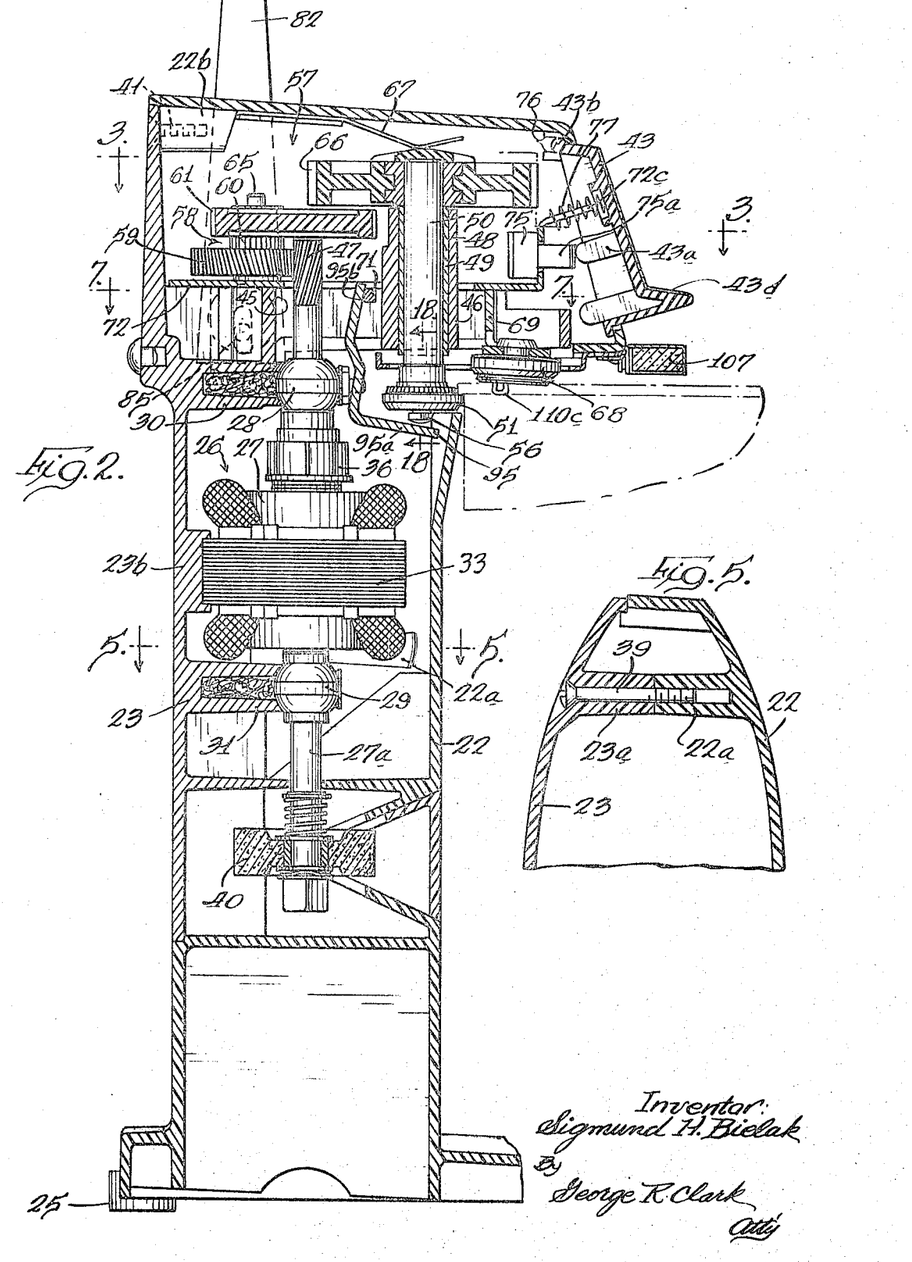
FIG. 2 is an enlarged vertical section taken along line 2—2 of the can opener shown in FIG. 1.
FIG. 5 is a fragmentary sectional view taken on line 5—5 of FIG. 2.

The housing 21 forms a hollow upright portion within which an electric motor 26 is mounted. The cover portion 22 of the housing is formed of a plastic material while the supporting frame 23 which serves as a cover for the rearwardly facing opening in the cover portion is made of zinc or other material suitable for diecasting. The housing portions 22 and 23 are retained in assembled relation by several screws 39 which extend through abutting bosses 22a and 23a as is best shown in FIG. 5. In addition to the two horizontally spaced screws 39, there is a third assembly screw 41 which extends through the upper edge of frame 23 into threaded engagement with a tapped boss 22b as shown in FIG. 2.

Figure 4:
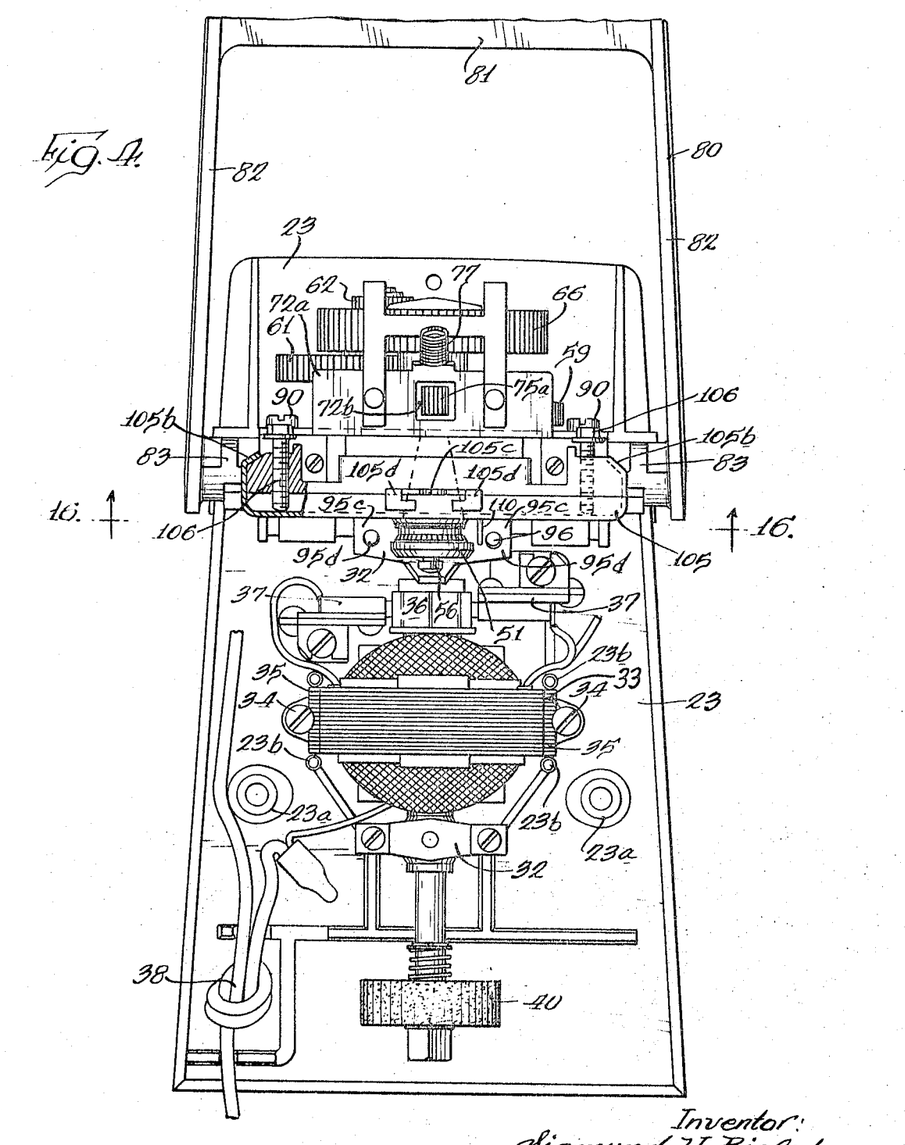
FIG. 4 is a front elevational view of the can opener of FIG. 1 with the base and cover portion thereto removed to expose the machanism contained therein.

As is best shown in FIGS. 2 and 4, the frame 23 supports the various elements of the motor 26. The motor is provided with an armature 27 having an armature shaft 27a which is supported by a pair of vertically spaced armature bearings 28 and 29. The armature bearings 28 and 29 are supported on integrally cast projections 30 and 31 respectively which are formed with suitable semi-spherical recesses for the bearings and recesses for oil retaining wicks, as is well-known in the art. The bearings 28 and 29 are retained in assembled position by means of resilient straps 32.

The motor 26 includes a field 33 which is secured to the supporting frame 23 by means of screws 34. Suitable cast field supports 23b on the frame 23 engage lamination projections 35 to locate and support the field with respect to the frame 23.

At the upper end of the armature shaft 27a immediately below the bearing 28, there is a commutator 36. Suitable brush assemblies 37 are carried by the frame 23 in position with their brushes in spring biased engagement with the commutator 36. Suitable electrical connections are provided between a power cord 38 and the above-described elements of the motor 26.

At the lower end of the armature 27, there is provided a knife sharpening wheel 40. The details of the knife sharpening wheel and the manner in which it cooperates with the remainder of the housing 21 is described and claimed in a copending application filed in the name of Gilbert R. Wolter and assigned to the same assignee as the instant invention. The details of the knife sharpener will not, therefore, be disclosed in the instant application.

Figure 7:
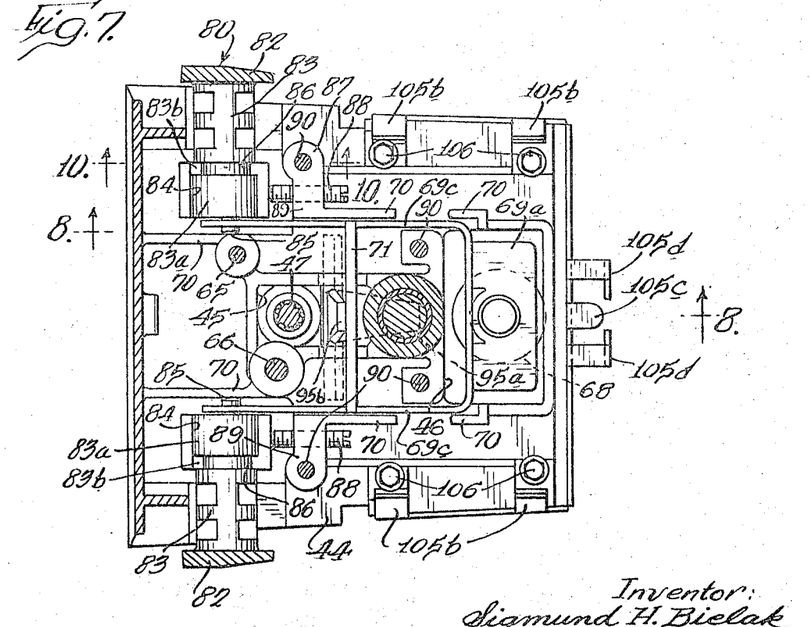
FIG. 7 is a sectional view taken along line 7—7 of FIG. 2 assuming that FIG. 2 shows the complete structure.
Figure 8:
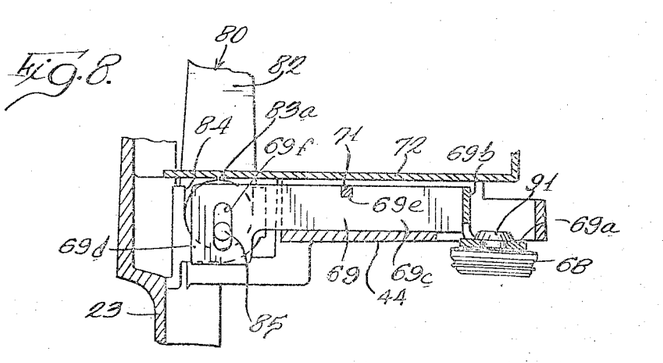
FIG. 8 is a fragmentary vertical section taken along line 8—8 of FIG. 7 showing the slide which supports the cutting wheel and a portion of the operating handle.
Figure 9:
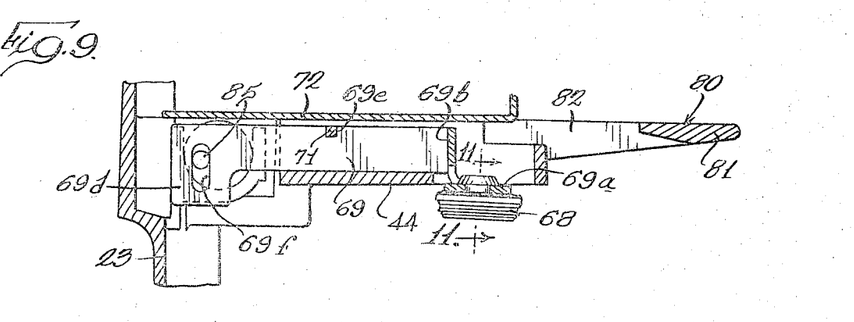
FIG. 9 is a fragmentary vertical section similar to FIG. 8 but showing the parts in position for cutting the cover of a can.

The upper end of the housing 21 is shaped to form an enlarged overhanging head portion 42 which portion is defined by the upper ends of the cover portion 22, the supporting frame 23 and a movable actuating member 43. As is best shown in FIG. 7, the supporting frame 23 is provided with a horizontally-extending shelf portion 44. This shelf portion 44 has two large central openings, on toward the rear of the frame designated by reference numeral 45 and another toward the front of the frame designated by reference numeral 46. The upper end of the armature shaft 27a extends through the opening 45 into the head portion 42 of the housing and is formed with a worm gear 47 thereon.

Between the rear opening 45 and the front opening 46 in the frame 23, there is an elongated bearing supporting boss 48 extending upwardly with respect to the shelf portion 44. Received within the elongated boss 48 is a bearing 49 which journals for rotation a feed wheel supporting shaft 50.

At the lower end of the shaft 50, there is provided a feed wheel or can rotating wheel 51. Mounted on the lower end of the shaft 50 is a collar 52 which, together with spacers or shims 53, determines the extent of the upward movement of shaft 50. At the lower end of the shaft 50 there is a threaded portion 54 on which the can rotating wheel 51 is threadedly received. A threaded axial bore 55 extends upwardly in the lower end of the shaft 50 to receive a feed wheel adjustment screw 56. When the shaft 50 is urged upwardly, the shims 53 seat against the lower end of bearing 49 and cooperate with collar 52 to limit the upward movement of feed wheel 51. Through the use of varying numbers of shims 53, this location may be accurately determined.

In order to drivingly relate the motor 26 and the feed wheel shaft 50, there is provided a reduction gear train 57. The gear train 57 includes a first gear member 58 having a large helical gear 59 in driven engagement with the gear 47. The gear member 58 also includes a small diameter output spur gear 60 which is in driving engagement with a large spur gear 61 which is integrally formed with a small output spur gear 62. The gears 61 and 62 make up a second gear member 63 which is journaled on a stub shaft 64 press fitted in the die cast frame 23. Similarly, the first gear member 58 is rotatably supported on a shaft 65 pressed into the frame 23. The gear 62 is drivingly engaged with a large spur gear 66 which is moulded on to the upper end of the feed wheel shaft 50. The gear members 58 and 63 as well as the gear 66 may be formed of any suitable high strength plastic material.

Secured to the inside upper wall of the head portion 42 of the housing 21 is a leaf spring 67 which includes a V-shaped portion 67a positioned to engage the gear 66 on the upper end of shaft 50. The spring 67 has a fixed end 67b which is received between integrally formed ribs on the head portion 42 and a plastic protuberance extends through an opening in the portion 67b. This protuberance is deformed through the use of heat and pressure to retain the spring 67 in assembled position within the housing 21. The spring 67 is intended to bias the feed wheel shaft 50 downwardly so that in its lowermost position, the hub of the gear 66 is in engagement with the bearing 49. As will be explained below, means are provided to raise the feed wheel shaft 50 upwardly in an axial direction in order to move the feed wheel or can rotating wheel 51 into the position for rotating and cutting the cover of a can.

Figure 12:
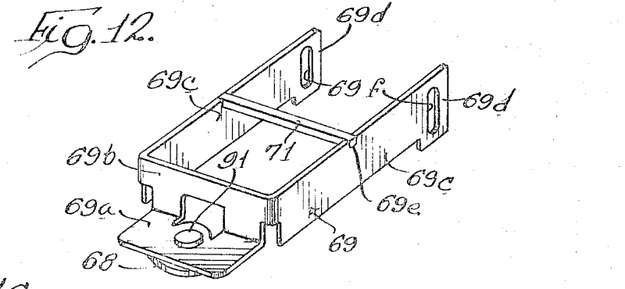
FIG. 12 is a perspective view of the cutter supporting slide.

For the purpose of movably supporting a can cutting wheel or cutter 68, there is provided a slide 69. The slide 69 is U-shaped in configuration as is best shown in the perspective view of FIG. 12. The cutting wheel 68 is supported on a horizontally disposed portion 69a which projects forwardly from the bight portion 69b of the slide. Extending rearwardly are a pair of leg portions 69c which terminate in vertically extending actuating portions 69d. The slide 69 is supported for horizontal forward and backward movement on the shelf portion 44. The movement of the slide 69 is guided by a plurality of integrally cast wall portions 70 which extend upwardly from the horizontal shelf 44. Positioned across the legs 69c intermediate their ends is a transversely extending spring bar 71. The ends of the spring bar 71 are received in notches 69e in the legs 69c. Lengthwise displacement of the spring bar 71 with respect to the slide 69 is prevented by the walls 70 as is best shown in FIG. 7. To retain the slide 69 in position against the shelf portion 44 there is provided a cover 72 which extends across the upper edges of the walls 70. The position and contour of the cover 72 is best shown in FIGS. 3, 6, 8, and 9. The cover 72 obviously retains the bar 71 against upward displacement also.

Figure 6:
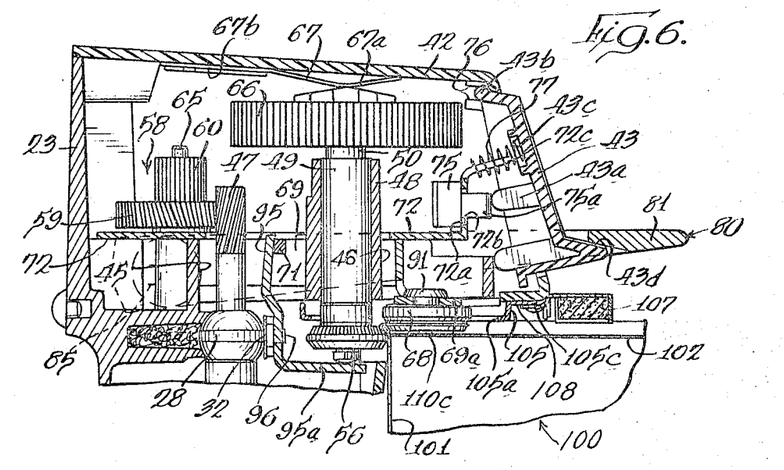
FIG. 6 is a fragmentary sectional view of the upper part of the can opener taken on the same line as FIG. 2, but with the parts shown in a can cutting position.

For the purpose of energizing the motor 26, there is provided a starting switch 75 which is riveted or otherwise secured to a vertically extending wall 72a provided on the front of the cover 72. The switch 75 includes an actuating button 75a which extends forwardly through an opening 72b in the supporting wall 72a. The movable actuating member 43 which forms the front wall of the head portion 42 is formed with a rearward projection 43a which is aligned with the actuating button 75a. The upper edge of the actuating member 43 terminates in a transversely extending hinge rib 43b. The ends of the hinge rib 43b are received in notches 76 on opposed edges of the head portion 42. This provides a pivot about which the actuating member 43 may rotate. In order to bias the actuating member to a switch open position, there is provided a helical biasing spring 77 which is received on a projection 72c extending from the upper edge of wall 72a as is best shown in FIG. 6. Immediately opposite the spring supporting projection 72c is a recess 43c in the actuating member 43. The recess 43c receives the outer end of the biasing spring 77 and prevents displacement of the spring when the actuating member 43 is rotated about the hinge rib 43b.

Figures 1, 3:
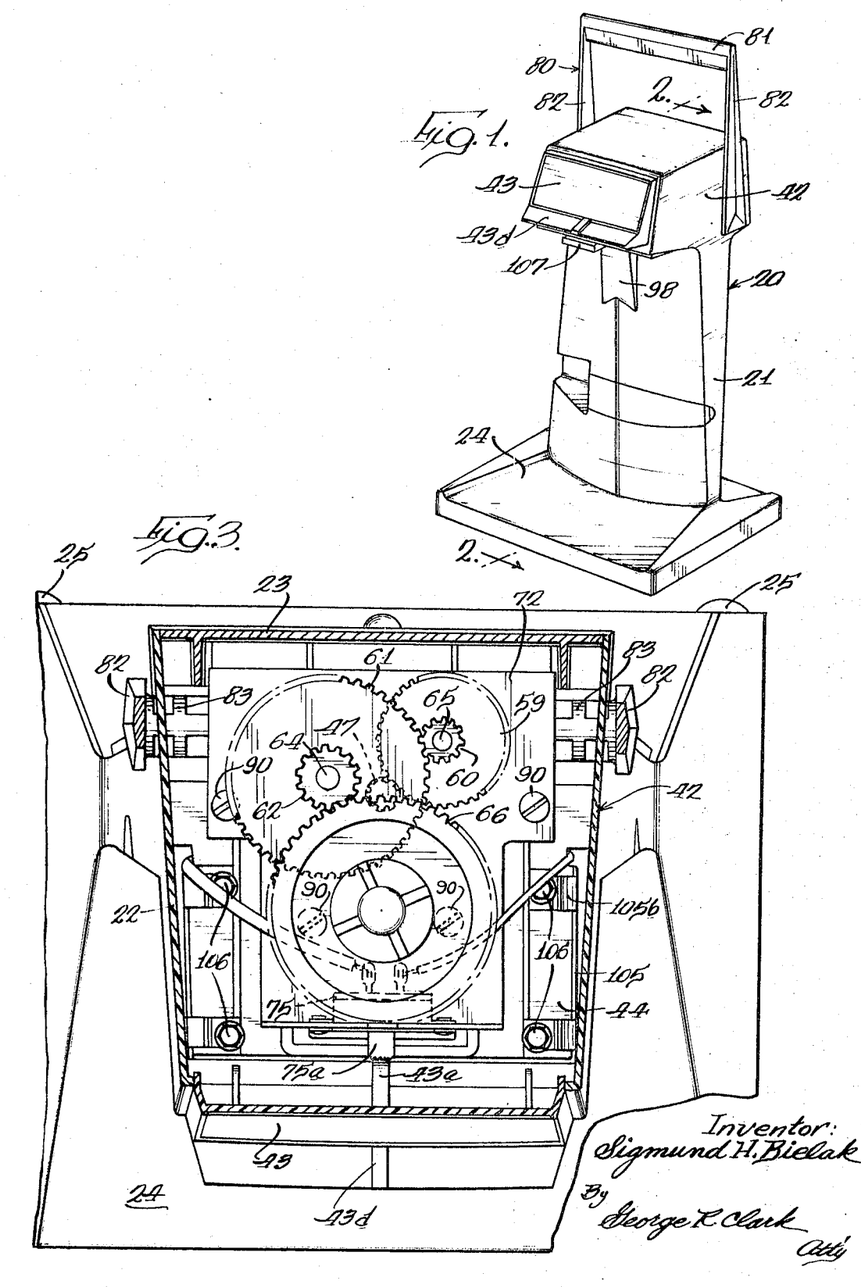
FIG. 1 is a perspective view of an electric can opener embodying the present invention.
FIG. 3 is a sectional view taken on line 3—3 of FIG. 2.

To operate the can opener 20 in opening a can, it is necessary only to move an operating lever 80 from a can loading position as shown in FIG. 1 to a can loading position as shown in FIG. 6. The operating lever is a U-shaped member including a handle portion 81 and a pair of parallel legs 82. When the operating lever 80 is moved to the can cutting position as shown in FIG. 6, the handle portion 81 engages a forwardly protruding shelf 43d on the actuating member 43. This causes the actuating member 43 to be rotated against the action of the helical biasing spring 77 into switch actuating engagement with the button 75a.

At the same time the operating lever actuates the switch 75 to initiate operation of the motor 26, the slide 69 is caused to move rearwardly thereby moving the can cutting wheel 68 into cutting engagement with the end seam of a can. This movement of the slide 69 is accomplished by means of the supporting trunnions 83 which extend inwardly from the lower ends of the legs 82 of the operating handle 80. The trunnions 83 are formed with cylindrical portions 83a which are journaled in semi-cylindrical recesses 84 formed in the horizontal shelf 44. Extending inwardly from the inner ends of the trunnions 83 are eccentric pins 85 which are received in vertically extending slots 69*f* on the slide 69. The pins 85 are mounted eccentrically with respect to the axis of the cylindrical portion 83*a* about which the operating handle 80 pivots. As is most clearly shown in FIGS. 8 and 9, the rotation of operating lever 80 causes the eccentric pins 85 to move rearwardly and by virtue of their engagement with the slide 69 in the slots 69*f* cause the slide 69 to move rearwardly.

Figure 10:
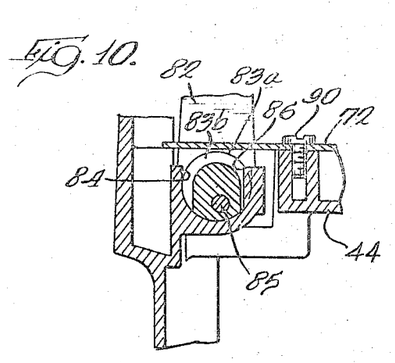
FIG. 10 is a fragmentary sectional view taken along line 10—10 of FIG. 7.

To provide additional rigidity to the connection between the operating lever 80 and the slide 69, the shelf portion 44 of the frame 23 is formed with an additional radially extending wall 86 positioned immediately outwardly of the semi-cylindrical recess 84. The wall 86 as is best shown in FIGS. 7 and 10 projects inwardly across the outer edge of the cylindrical portions 83*a* of the trunnions 83. This arrangement prevents lateral displacement of the portions 83*a* as the force is applied to the slide 69. The trunnions 83 are recessed at 83*b* to provide clearance for the wall portion 86 as is best shown in FIG. 10.

Figure 17:
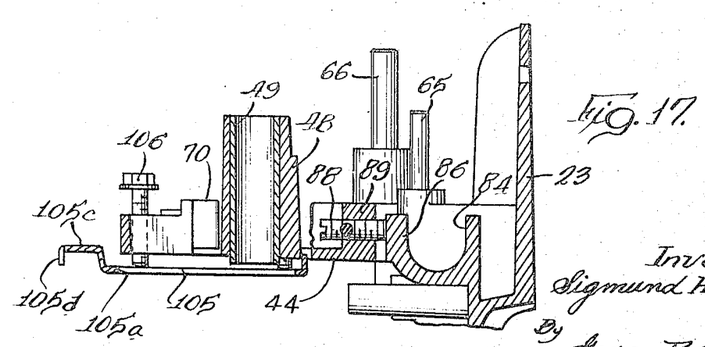
FIG. 17 is a sectional view taken on line 17—17 of FIG. 16.

In order to adjust the axis about which the trunnions 83 and the operating lever 80 pivot, there are provided adjusting screws 88 which are threadedly received in horizontally extending openings in the upstanding wall portion 89 provided on the shelf portion 44. As is best shown in FIGS. 7 and 17, the screws 88 extend horizontally through the wall portions 89 and abut against the wall portions defining the semi-cylindrical recesses 84. These recesses 84 are slightly oversize so that when the screws 88 are tightened, the wall against which the end of each of the screws abuts may be deflected slightly changing the pivotal axis of the operating lever 80. With the recesses 84 being somewhat oversize, this deflection of the walls on the forward side may be accomplished without causing binding or interference in the pivotal support of the portions 83*a* therein. It should be noted that the cover 72 extends above the cylindrical portions 83*a* of the trunnions 83 and retains them in position in the recesses 84. The cover 72 is retained on the upper surfaces of wall portions 89 and other projecting portions of the shelf 44 by means of four assembly screws 90 which are shown in FIGS. 3 and 4.

Figure 11:
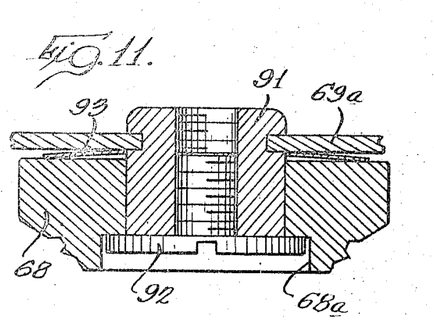
FIG. 11 is a greatly enlarged sectional view taken along line 11—11 of FIG. 9.

To provide a resilience in the horizontally applied force between the feed wheel 51 and the cutting wheel 68, the slide 69 is designed so that it provides a resilient support for the cutting wheel 68. The cutting wheel 68 is mounted for rotation on the slide 69 by means of a stud 91 which is rigidly secured to the portion 69*a* by spinning or otherwise deforming the stud as is best shown in FIG. 11. The stud 91 threadedly receives an assembly screw 92 which seats against the cutter 68 in a recess 68*a* formed in the lower face thereof. Positioned between the cutter 68 and the slide 69 is a spring washer 93 which permits the cutter 68 to be deflected upwardly a small amount so that cans having very high end seams may be accommodated in the can opener 20. As is evident from FIGS. 2 and 8, the axis of rotation of the cutter wheel 68 is tipped outwardly at the top so that the lower face of the cutting wheel is tipped slightly toward the can rotating wheel 51. As the can cutter moves from the position shown in FIG. 2 to the position shown in FIG. 6, the axis of the cutter moves from this tilted position to a substantially vertical position. The force applied to the cutting wheel through the slide 69 causes the forwardly projecting portion 69*a* of the slide to deflect slightly thereby causing the mounting stud 91 for the cutting wheel 68 to move to an essentially vertical position. This twisting or deflection in the slide 69 provides a means for accommodating various thicknesses of can seams and also provides a gripping force between the cutting wheel and the can rotating wheel.

Concurrently, with the horizontal movement of the cutting wheel during the initial stage of the can opening process, the can rotating wheel 51 is moved vertically. This vertical movement of the feed wheel 51 is accomplished by means of an L-shaped drive lever 95 which has one leg 95*a* positioned for engagement with the feed wheel adjustment screw 56 extending downwardly from the lower end of the shaft 50. Extending upwardly from the leg 95*a* is a leg 95*b*, the upper end of which is in driven engagement with the spring bar 71 carried by the slide 69. At the lower end of the vertically extending leg 95*b*, there are provided a pair of laterally extending supporting projections 95*c* as best shown in FIG. 4. The projections 95*c* are formed with oversize holes 95*d* which are received on studs 96 extending outwardly from the heads of the bolts which retain the upper bearing strap 32 in assembled position on the frame 23. Each stud 96 is loose enough in the respective hole 95*d* to permit limited pivotal movement of the L-shaped lever 95.

To observe the manner in which the L-shaped lever 95 operates on the feed wheel supporting shaft 50, FIGS. 2 and 6 of the drawings should be compared. The parts are shown in the can loading position in FIG. 6 at which time the shaft 50 is urged downwardly by the spring 67 to a position in which the hub of gear 66 is seated against the upper end of bearing 49. As the slide 69 moves to the left from the position shown in FIG. 2 to the position shown in FIG. 6, the spring bar 71 carried by the slide 69 engages the upper end of leg 95*b* of the lever 95 causing it to pivot counterclockwise about the studs 96. As a consequence of this pivotal movement, the outer end of leg 95*a* moves upwardly engaging the feed wheel adjustment screw 56 and urges the shaft 50 and cutter wheel 51 upwardly in opposition to the biasing force applied by spring 67. Thus, when the slide 69 reaches the extent of its rearward travel, the can rotating wheel 51 is in its elevated position as shown in FIG. 6. The purpose of the screw 56 is to permit a factory adjustment of the vertical position of the can rotating wheel 51 when it has reached its elevated position as shown in FIG. 6. The spring bar 71 in conjunction with lever 95 is resilient enough to maintain proper pressures on various heights of can seams.

To facilitate insertion of the can between the can rotating wheel 51 and the cutting wheel 68 when in the positions shown in FIG. 2, the cover portion 22 of the housing 21 is formed with a sloping ramp 98 which extends upwardly and outwardly from the column portion of the housing 21 to a position immediately below and even with the front of the feed wheel 51. As was explained above, the overhanging head portion 42 of the housing 21 tends to obscure the feed wheel 51 and the cutter 68 so that it is difficult to insert the end seam of a can between these two wheels. The ramp or guide 98 assists the operator in moving the can to the proper position for opening. The can may be moved rearwardly until it strikes the upright portion of housing 21 and then moved vertically until it stops. The ramp or guide 98 provides a means so that the upper end seam of the can will move over the feed wheel 51 when the can is moved upwardly and drop into the proper position for opening. Accordingly, the guide 98, as well as the widely spaced positioning of the wheels 51 and 68 in the loading position shown in FIG. 2, provide an arrangement in which the operator may easily and quickly position the can for opening by the can opener 20.

Figure 13:
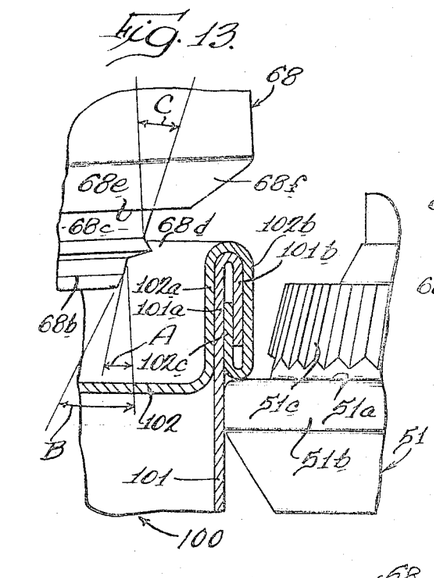
FIG. 13 is a greatly enlarged elevational view of the can cutting and can feeding wheels shown in the can loading position with a sectioned portion of a can positioned therebetween.
Figure 14:
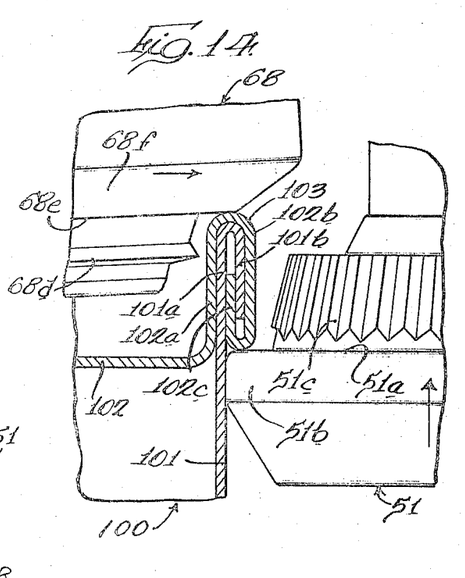
FIG. 14 is an elevational view similar to FIG. 13 with the can cutting wheel and can feeding wheel shown in a position intermediate the loading and the can cutting positions.
Figure 15:
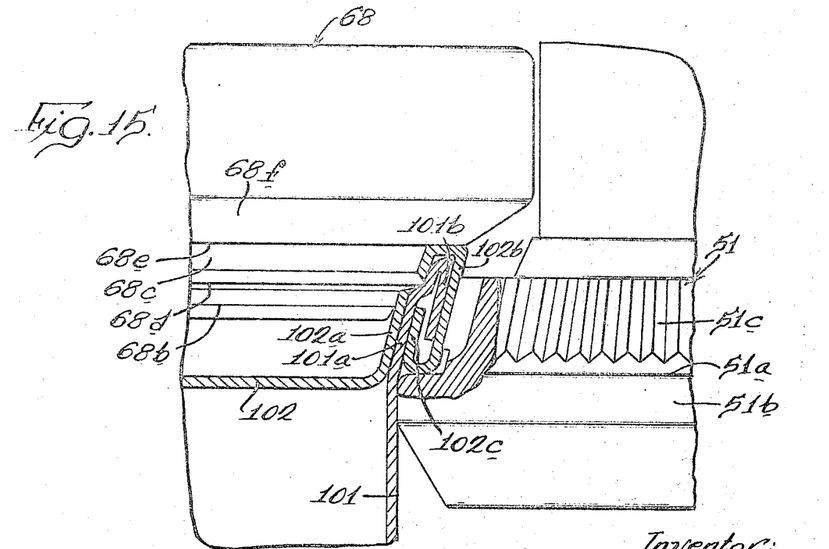
FIG. 15 is an elevational view similar to FIGS. 13 and 14 with the can cutting and can feeding wheels shown in cutting engagement with the end seam of a can.

To better understand the operation of the can opener and the configuration of the can rotating and can cutting wheels, reference should be had to the enlarged drawings designated FIGS. 13, 14 and 15. Shown in section in these figures is the upper end seam of a can 100. The can 100 includes a cylindrical side wall 101 and a generally flat horizontal top 102. The top of the cylindrical side wall 101 and the cover 102 are joined together by an end seam 103 which consists of five cylindrical layers of metal which are sandwiched together and sealed with some sort of non-toxic sealing. As is evident from FIGS. 13 and 14, the outer two layers and the center layer are cylindrical portions of the cover which are designated 102a, 102b and 102c, these portions being the inner layer, the outer layer, and the central layer respectively. Positioned between the layers 102a and 102c is an upper edge portion 101a of the can wall 101. The portion 101a is connected to the cylindrical layer 101b which is positioned between the layers 102b and 102c. The only reason for designating the various parts of the end seam in such detail is that the operation of the cutter and feed wheels, as well as their structure, is related in a significant fashion to the structure of the end seam.

To support the portion of the end seam extending outwardly from the wall of can 100, the can rotating wheel 51 is provided with an annular shoulder 51a which is designed to receive on its upwardly facing surface the downwardly facing edge of the end seam as is shown in FIGS. 13 and 14. A cylindrical shoulder 51b positioned below the annular shoulder 51a rotates in engagement with the side wall 101 of the can. Extending upwardly and inwardly from the shoulder 51a is a conical serrated surface 51c which is intended to engage and dig into the outer surface of the end seam 103 and assure rotation of the can with the feed wheel 51 during the opening operation. In one preferred embodiment of the invention, the conical surface at any point forms an angle of 20° with the axis of the feed wheel.

Turning now to the cutting wheel 68, we note that toward the bottom it is provided with a first conical surface 68b which is spaced from a second conical surface 68c by an annular protruding cutting edge 68d. In one preferred embodiment of the invention, the lower conical surface 68b was constructed to include two conical sections, the lowermost of which was less steep than the adjacent portion. Referring to FIG. 13 which shows the angles between the conical surfaces and a vertical line parallel to the axis of the wheel 68, the values of angles A and B were 15 and 30 degrees, respectively. Angle C in the preferred embodiment was 20 degrees. The conical portions 68b and 68c serve the purpose of both bending the end seam outwardly and holding the end seam while the cutting operation is performed as is evident from FIG. 15.

The annular cutting edge 68d is dimensioned so that it protrudes only a short distance outwardly from the conical surfaces 68b and 68c. The amount of protrusion of the cutting edge 68d is very critical since it is desirable that only the inner layer 102a of the end seam be severed. In a preferred embodiment of the invention in which the cutting edge 68d extended .011″ from the surface 68c, a satisfactory cutting action was achieved without severing the adjacent layer 101a of the can side wall.

Immediately above the conical surface 68c the cutting wheel 68 is formed with a downwardly facing shoulder 68e which is designed to engage the upper edge of the end seam 103 and position the cutting edge 68d accurately with respect to the end seam. Extending outwardly and upwardly from the shoulder 68e is a cam surface 68f which tends to guide the end seam into seated engagement with the shoulder 68e. In actual practice the surface 68f performs little or no camming function since the feed wheel 51 carries the can upwardly into engagement with the shoulder 68e. If, however, the operator positions the can end seam 103 above the shoulder 51a on the can rotating wheel 51, the cam surface 68f would force the can downwardly into proper position as the cutter 68 moved toward the engaged position with the end seam.

FIG. 15 portrays the position of the can rotating wheel 51 with respect to the can cutting wheel 68 as the cutting edge 68d is in cutting engagement with the inner layer 102a of the cover. As has been mentioned above, one of the principal advantages of this type of can opener is the fact that the cutter severs the cover from the remainder of the can at a position well up on the end seam and well spaced from the contents of the can. As the cut is completed, the outward bending of the can causes the portion 102a still connected to the cover to break loose from its engagement with the layer 101a at the top of the can wall.

As a consequence of the fact that cans are fabricated of different materials and materials of different thickness, it is necessary for the can cutter to operate properly under many different conditions. One of the principal problems in this regard is that of severing a single layer of material on the inner diameter of the end seam without damaging the remainder of the end seam thereby producing a rough and dangerous edge as well as an edge which would tend to interfere with disengagement of the severed cover from the can. It has been discovered that by positioning the cutting edge 68d above the upwardly extending edge of layer 102c it is possible to make a fairly deep cut on the end seam without penetrating more than the inner layer of material. The upper portion of the end seam above the layer 102c may merely be compressed and deformed while not producing the ragged and undesirable edge mentioned above. Thus, as seen in FIG. 15, the cutting edge 68d has penetrated far past the position necessary to cut the layer 102a but because of the outward deformation of layer 101a there has been little or no penetration of this second layer.

Regarding the profile of the cutter 68, it is very evident that the lower conical surface 68b is offset inwardly from the outer cutting edge 68d a distance almost twice as great as the offset associated with the lower edge of the conical surface 68c. This increased offset below the cutting edge 68d creates a favorable condition in which the cutting edge will completely sever the thickest can material available while little or no damage will be caused to the remaining portion of the end seam when a cover is severed from a can made of relatively thin aluminum. In severing the cover from the thin aluminum can the upper conical surface 68c merely serves to displace the upper portion of the end seam outwardly as shown in FIG. 5 and little effect is noted of the cutting edge on the inner layers in the end seam. With respect to these light aluminum cans, it should also be noted that the conical serrated surface 51c on the can rotating wheel is positioned in opposed relationship to the cutting edge 68d. This arrangement prevents the cutter from riding off the upper edge of the end seam and becoming disengaged from cutting engagement therewith. In a preferred embodiment of the invention this offset between the shoulder 68e and the cutting edge 68d was about .030″. It should be noted that in Jepson et al. Patent No. 3,216,108 the cutting edge was spaced relatively close to the downwardly facing shoulder corresponding to 68e, and, by this arrangement, it was intended to cut the inner wall 102a above the can walls 101a and 101b. As suggested above, this approach presented problems with respect to some cans when the cutting edge would slide off the upper edge of the end seam.

Figures 16, 18:
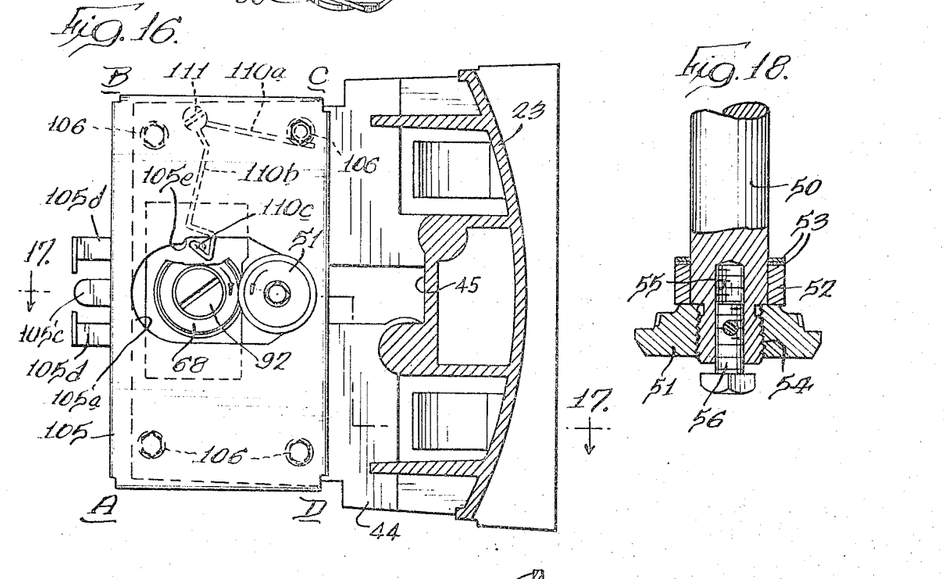
FIG. 16 is a sectional view taken on line 16—16 of FIG. 4.
FIG. 18 is a fragmentary sectional view taken on line 18—18 of FIG. 2.

Even with the cutting edge 68d properly positioned a selected distance downwardly from the upper edge of the end seam, there is a tendency for the end seam to disengage itself from cutting engagement with the cutting wheel 68. This tendency is more pronounced when cutting heavy cans, the weight of which tends to draw the end seam downwardly out of proper position between the wheels 51 and 68. This tendency is eliminated through the use of a guide plate 105 which is supported immediately below the horizontal shelf portion 44 of the frame 23. The guide plate 105 as is best shown in FIG. 16 includes a large central opening 105a through which the cutting wheel 68 and the can rotating wheel 51 extend. The purpose of this guide plate 105 is to engage the upper edge of the can end seam 103 when the can is gripped for opening as shown in FIG. 6. The guide plate 105 is inclined with respect to the axes of the cutter and feed wheels so that the end seam of the can will be fed upwardly as it passes between the feed and cutting wheels. Actually, this upward direction of the end seam apparently cancels the tendency toward disengagement and causes the end seam 103 to feed between the two wheels at a uniform height so that a very accurate and precise cut is made.

The guide plate 105 is secured to the shelf portion 44 of frame 23 by means of upwardly and inwardly directed ears 105b which extend above the shelf portion 44 into interlocking relation therewith. To position the guide plate 105 and retain it against displacement with respect to the shelf portion 44 there are provided four screws 106 which are threadedly received in openings in the shelf portion 44 and extend vertically into engagement with the corners of the guide plate 105 as is best shown in FIGS. 4 and 7. Through tightening the screws 106, the plate 105 may be positioned at any selected angle of inclination with respect to the axes of the feed and cutter wheels. As the screws are tightened the ears 105b are deflected slightly thus permitting downward movement of the plate but still retaining it rigidly with respect to the shelf portion 44. To produce the desired inclination of the guide plate 105 the screws are adjusted so that the corners B and C as indicated on FIG. 17 are .040 of an inch higher than corners A and D. This slope across a length of about 3½" proved to give satisfactory results in one constructed embodiment. It should be appreciated, however, that variations in the size of the guide plate and in the structure of the cutting wheels would necessitate changes in this slope to obtain optimum performance. The invention contemplates the use of the guide plate for engagement with the upper end seam of the can to produce the upward feeding of the end seam in order to prevent disengagement of the end seam from the can cutting wheel.

It has also been found desirable to slope the guide plate 105 slightly from front to rear, with the front edge of the guide plate being approximately .015" lower at the front than the rear. This front to rear inclination is necessary to assure good engagement between the guide plate 105 and the upper edge of the end seam.

The forward edge of the guide plate 105 is provided with means for mounting a lid retaining magnet 107. The magnet 107 is provided with a rearwardly extending mounting tang 108 which is received between a central mounting projection 105c and a pair of spaced L-shaped retaining means 105d. The projection 105c and the L-shaped retaining means 105d are formed integrally with the guide plate 105. The magnet 107 is secured to the guide plate by merely inserting the mounting tang between the projection 105c and the retaining means 105d. The tang 108 is formed with deformed portions at the edge which engage the inner surface of the outer ends of the retaining means 105d to secure the magnet assembled thereto with a detent action so that it is readily removable for cleaning. The contour of the projection 105c and the retaining means 105d is best shown in FIGS. 4 and 16 in which the magnet 107 has been removed for illustrative purposes.

The magnet 107 is effective in gripping a can cover after it has been removed and retains it while the can is removed from the can opener. During the final stage of the opening operation there is a tendency for the can cover to pivot upwardly as only a small portion of material remains connecting the can to the end seam of the can. If the cover is permitted to pivot upwardly prior to the completion of the cut, the cutter will tend to produce a helical sliver as it passes the point where the cutting action began. In order to avoid this undesirable result, there is provided a spring finger 110 which is secured to the lower surface of the shelf portion 44 by means of retaining screw 111. The spring finger is somewhat L-shaped as seen in FIG. 16 having a loop extending around the shank of screw 111 connecting the legs 110a and 110b. The outer end of leg 110a engages the lower end of one of the adjustment screws 106 and is thereby restrained from rotation in the counterclockwise direction as viewed in FIG. 16. The outer end of leg 110b has a more or less C-shaped portion 110c, the lower end of which extends downwardly through the opening 105a in the guide plate 105.

As may be seen in FIG. 2 the portion 110c of the spring finger 110 extends slightly below the level of the cutting wheel 68 to a position where it engages the cover of a can being opened. A portion of the spring finger 110 is also visible in FIG. 4 immediately to the right of the feed wheel 51. The spring finger 110 is made very flexible and resilient so that it may be deflected on insertion or removal of a can without bending or permanently deforming it. Thus, if as the can is inserted in cutting position the operator engages the portion 110c of the spring finger with the outer edge of the end seam and pushes the can rearwardly, the spring finger 110 will merely move rearwardly to the limit of its travel and then snap over the end seam coming to rest in engagement with the cover of the can. The opening 105a is provided with a notch 105e which provides a seat and tends to limit the forward movement of the portion 110c.

For the spring finger to be effective in preventing deflection of the can cover 102 prior to the completion of the cut, it is necessary that it be positioned to one side and closely adjacent to the cutting wheel 68. Since the finger 110 must be in such close proximity to the cutter 68, it is designed to minimize any interference with the insertion of a can between the cutting wheel 68 and the feed wheel 51. The rounded end of the finger and the fact that it will accommodate horizontal deflection are aspects which prevent it from interfering with the loading of a can into cutting position. It should also be noted that the finger 110 protrudes a very slight distance below the guide plate 105.

Another function performed by the spring finger 110 is that of urging the inner edge of the cover downwardly slightly after the cover has been completely severed from the can. This downward deflection of the inner edge of the cover causes the outer edge to be biased upwardly causing the cover to positively engage the magnet 107. Since the magnet is spaced one-eighth of an inch or so from the cover of a typical can, it is conceivable that it might not attach itself to the cover were it not for the deflecting action produced by the spring finger 110.

The opening of a can utilizing the principles discussed in Jepson et al. Patent No. 3,216,108 requires a very precise machine capable of applying large forces to the end seam of a can during the cutting and bending operation. Inherent variations in the materials and dimensions of these end seams increase the problems presented considerably. For a can opener of this type to operate satisfactorily, it is necessary that the can cutting and can rotating wheels be positioned accurately with respect to the end seam of the can being opened. In addition, the can guiding means and the cover biasing means must be accurately positioned if a single continuous cut is to be made in one revolution of the can. The embodiment described above includes provision for factory adjustments which overcome tolerance problems and assure accurate positioning of the can cutting, can feeding and can guiding means. The adjustment screws 88 permit adjustment of the relative spacing between the axes of the can rotating wheel 51 and the can cutting wheel 68. By careful control of the spacing of these axes, the desired clamping force applied through the resilient slide 69 to the end seam 103 by the cutting and feeding wheels may be accurately controlled. In addition, the vertical space between the downwardly facing shoulder 68e on the cutting wheel 68 and the upwardly facing shoulder 51a on the feed wheel 51 may be accurately controlled through a calibration process utilizing the feed wheel adjustment screw 56. In addition, the relationship between the guide plate 105 and the feed and cutting wheel axes may be accurately established through the positioning of the adjustment screws 106.

As the terms vertical and horizontal and their equivalents are used in both the specification and the claims, it should be understood that they are used only to provide relative orientation of the parts and not intended as limitations as to the position of use of the apparatus. These terms have been used since cans are generally opened at the top in a vertical position to prevent spillage of their contents. In instances where such spillage does not present a problem, it is contemplated that the apparatus disclosed and claimed herein could be oriented in any desired position. The term cutting means as used in the claims is intended to include both the cutting wheel and the can drive wheel as described in the specification.

While there has been illustrated and described a single preferred embodiment of the invention, it will be readily understood by those skilled in the art that numerous changes and modifications can be made without departing from the present invention.

What is claimed as new and desired to be secured by Letters Patent of the United States is:

1. A can opener comprising a frame supporting relatively movable cutting and can rotating wheels, said wheels being movable between a loading position in which they are spaced a substantial distance apart to permit insertion of the end seam of a can therebetween and a can cutting position in which the end seam is gripped between said wheels with said cutting wheel engaging the inside diameter of said end seam, a guide plate secured to said frame and positioned to engage the upper edge of a can end seam oriented in an upright position, means driving said can rotating wheel in the cam cutting position to rotate said can about its axis whereby said cutting wheel forms a continuous cut on the inside diameter of the end seam to sever the lid from the can, said guide plate being inclined from a position normal to the axis of rotation of said cutter wheel to cause said cutter to feed into the end seam of the can so that it will track properly as the can is rotated, the axes of said cutter and feed wheels being positioned in substantially the same vertical plane, said guide plate being inclined downwardly from said can rotating wheel toward the axis of said can being opened, said guide plate having an opening formed therein through which said can cutting and can rotating wheels extend downwardly to engage said can, said guide plate being secured to said frame by individually adjustable means in each corner thereof to permit adjustment of the height of each corner of said plate.

2. The can opener of claim 1 including a lid retaining magnet, a holder for said magnet having a rearwardly extending tang, mounting means formed integrally with the front edge of said guide plate for receiving said tang to detachably support said magnet on said can opener.

3. A can opener comprising a frame supporting relatively movable cutting and can rotating wheels, said wheels being movable between a loading position in which they are spaced a substantial distance apart to permit insertion of the end seam of a can therebetween and a can cutting position in which the end seam is gripped between said wheels with said cutting wheel engaging the inside diameter of said end seam, a guide plate secured to said frame and positioned to engage the upper edge of a can end seam oriented in an upright position, means driving said can rotating wheel in the can cutting position to rotate said can about its axis whereby said cutting wheel forms a continuous cut on the inside diameter of said end seam to sever the lid from the can, said guide plate being inclined from a position normal to the axis of rotation of said cutter wheel to cause said cutter to feed into the end seam of the can so that it will track properly as the can is rotated, said wheels being rotatable about spaced substantially vertical axes, said guide plate having an opening formed therein through which said can cutting and can rotating wheels extend downwardly to engage said can, a cover biasing finger secured to said frame, a follower portion on said finger extending through said guide plate opening and being positioned adjacent to and laterally spaced from a vertical plane extending through said vertical axis, said follower portion engaging the can cover immediately adjacent said cutting wheel to prevent deflection upwardly of the portion of the cover approaching the cutter prior to completion of the cut.

4. A can opener comprising a frame supporting relatively movable cutting and can rotating wheels, said wheels being movable between a loading position in which they are spaced a substantial distance apart to permit insertion of the end seam of a can therebetween and a can cutting position in which the end seam is gripped between said wheels, a guide plate secured to said frame and positioned to engage the upper edge of a can end seam oriented in an upright position, means driving said can rotating wheel in the can cutting position to rotate said can about its axis whereby said cutting wheel forms a continuous cut to sever the lid from the can, said guide plate being inclined from a position normal to the axis of rotation of said cutter wheel to cause said cutter to feed into the end seam of the can so that it will track properly as the can is rotated, said wheels being rotatable about substantially vertical axes, said cutting wheel being positioned to cut the inside diameter of a can end seam, said guide plate having an opening formed therein through which said can cutting and can rotating wheels extend downwardly to engage a can, said guide plate being secured to said frame by individually adjustable means in each corner thereof to permit adjustment of the height of each corner of said plate, a cover biasing finger secured to said frame, a follower portion on said finger extending through said guide plate opening and being positioned laterally of said cutting wheel to engage the can cover immediately adjacent said cutter to prevent deflection of said cover, said finger being an elongated resilient means secured to said frame above said plate, said follower portion being deflectable by a can being inserted into said can opener, said follower portion returning to its cover engaging position when said can is seated in the can opening position.

5. The can opener of claim 1 wherein said frame is formed with a shelf portion above said guide plate, retaining means on said guide plate extending around said shelf portion to retain said guide plate thereon, said adjustable means comprise threaded means extending through threaded openings in said shelf portion into engagement with said guide plate, said retaining means being resilient to permit positioning of said plate by means of said adjustment means.

6. In a can opener of the type including can cutting and can rotating means which are relatively movable between a can loading position wherein said cutting and rotating means are spaced apart to receive the end seam of a can therebetween and a can cutting position wherein said end seam is gripped between said cutting and rotating means, the combination comprising a frame supporting a can rotating wheel for rotation about a first axis, drive means for rotating said wheel, a can cutter movably mounted on said frame, an operating handle connected to said cutter to move said cutter horizontally toward said can rotating wheel, and means connecting said operating handle to said wheel to move said wheel axially toward said cutter at the same time said cutter is moved toward said can rotating wheel.

7. The combination of claim 6 wherein said can cutter comprises a cutting wheel mounted for rotation about a second axis substantially parallel to said first axis and a slide member supporting said cutting wheel for movement normal to said second axis when moving from said can loading position to said can cutting position.

8. The combination of claim 7 wherein said operating handle is pivotally mounted on said frame, eccentric means connecting said handle to said slide member to move said slide member and cutting wheel between said can cutting and can loading positions.

9. The combination of claim 6 wherein said cutter is carried by a slide member which is mounted on said frame for sliding movement normal to said first axis, said operating handle being connected to said slide member to move said cutter between said can loading and can cutting positions, an axially movable shaft supporting said can rotating wheel for rotation on said frame, means interconnecting said slide member and said shaft to raise said shaft and rotating wheel toward said cutter as said cutter is moved from said can loading position to said can cutting position.

10. The combination of claim 9 wherein said means interconnecting said slide member and said shaft comprises a bell crank pivoted to said frame with a vertically extending leg engaged by said slide member and a horizontally extending leg in engagement with the lower end of said shaft, and resilient means on said slide member engaging said vertical leg to provide a resilient biasing force upwardly on said cam rotating wheel.

11. The combination of claim 6 wherein said cutter comprises a cutting wheel having a downwardly facing annular shoulder for engagement with the upper edge of the end seam of a can, a circular cutting edge on said cutting wheel spaced axially downward from said shoulder, said cutting wheel being mounted for rotation about a second axis substantially parallel to said first axis, said can rotating wheel having an upwardly facing annular shoulder for engagement with the lower edge of said end seam and a can gripping portion extending upwardly from said upwardly facing shoulder to engage the outer surface of said end seam, said shoulders being movable toward each other to grip said end seam as said wheels move from said can loading to said can cutting position.

12. In a can opener of the type designed for opening a can having an end seam made up of five interleaved cylindrical layers, the center and outer two layers of which are formed from the cover and the other two spaced layers are formed by the upper and outwardly turned edge of the can wall, the combination comprising a frame supporting a cutting wheel and a can rotating wheel for rotation about substantially parallel axes, means mounting said wheels on said frame for movement between a closely spaced can cutting position in which the end seam of the can is gripped between said wheels and a can loading position in which said wheels are well spaced to permit easy insertion of the end seam therebetween, said cutting wheel having a wide annular shoulder for engagement with the inside diameter of said end seam, a sharp cutting edge extending radially from the middle of said shoulder and being continuous around the entire periphery of said cutting wheel, and means on said wheels to locate said end seam in the cutting position of said wheels so that said cutting edge will cut said end seam at a point above the center layer of said cover in said end seam and below the portion connecting the upper and outwardly turned edge of the can wall.

13. The combination of claim 12 wherein said can cutting wheel includes a downwardly facing annular shoulder positioned axially upward from said cutting edge, said shoulder engaging the upper edge of a can end seam, said can rotating wheel having an upwardly facing annular shoulder for engagement with the lower edge of said end seam, said wheels being positioned in the can cutting position to grip said end seam between said annular shoulders.

14. The combination of claim 12 wherein said means to locate said end seam comprise opposed annular shoulders on said wheels, said shoulders being normal to the axes of said wheels and gripping said end seam therebetween, said can rotating wheel having radially extending serrations positioned above its annular shoulder to engage the outer periphery of the end seam, said wide annular shoulder on said cutting wheel being positioned to urge the end seam into said serrations, said annular shoulder being angled outwardly to flare said end seam to facilitate removal of the severed cover of a can.

15. A can opener comprising a frame, a can rotating wheel supported for rotation about a first axis fixed with respect to said frame, a slide member supported by said frame for sliding movement in a plane normal to said first axis, a cutting wheel mounted for rotation about a second axis fixed with respect to said slide member, said slide member being movable between a can loading in which said wheels are well spaced to permit easy insertion of the end seam of a can therebetween and a can cutting position in which said wheels are in gripping engagement with the end seam of a can, resilient means supporting said cutting wheel with respect to said slide member, said resilient means deflecting to permit movement of said cutting wheel in a direction of movement of said slide member so that end seams of various thickness may be accommodated between said wheels when said slide member is in the can cutting position.

16. A can opener comprising a frame, a can rotating wheel supported for rotation about a first axis fixed with respect to said frame, a slide member supported by said frame for sliding movement in a plane normal to said first axis, a cutting wheel mounted for rotation about a second axis fixed with respect to said slide member, said slide member being movable between a can loading position in which said wheels are well spaced to permit easy insertion of the end seam of a can therebetween and a can cutting position in which said wheels are in gripping engagement with the end seam of a can, resilient means supporting said cutting wheel with respect to said slide member, said resilient means deflecting to permit movement of said cutting wheel in a direction of movement of said slide member so that end seams of various thickness may be accommodated between said wheels when said slide member is in the can cutting position, said slide member comprising a U-shaped member having at the bight portion a cutting wheel supporting portion connected to said bight portion by a portion of reduced section, said cutting wheel being rotatably mounted on said support portion, operating means connected to the legs of said U-shaped member to move said slide member between said loading position and said can cutting position, said portion of reduced section on said slide member being of resilient material which deforms to vary the spacing between said wheels when end seams of various thickness are gripped therebetween.

17. The can opener of claim 16 wherein said second axis angles inwardly, said bight portion of said slide member twisting to tilt said cutting wheel and its second axis so that said second axis and said first axis are substantially parallel.

18. In a can opener of the type having a cutter for making a continuous cut around the inner diameter of the end seam to sever the lid from the can, the combination comprising means for rotating a can, a cutter movable into piercing engagement with the inner diameter of the end seam of a can, said cutter making a continuous cut on the end seam as the can is rotated, resilient biasing means acting downwardly against the cover of a can being opened, said biasing means engaging said cover immediately adjacent to said cutter laterally of the point of piercing engagement by the cutter against the end seam, said biasing means engaging said cover on the side of said cutter where the end seam is moving toward the cutter to prevent the lid of the can from tilting and being slivered by the cutter.

19. The combination of claim 18 wherein said biasing means comprises an elongated spring member disposed in a plane generally parallel to the cover of a can being opened, said member being deflectable in said plane and perpendicular to said plane to accommodate a can inserted in the can opener.

20. The combination of claim 18 wherein said cutter comprises a wheel rotatable about a substantially vertical axis, said wheel including a circular cutting edge and a conical surface for bending the end seam of a can outwardly to facilitate removal of the cover of the can after it is severed therefrom.

References Cited

UNITED STATES PATENTS

| | | | |
|---|---|---|---|
| 3,094,776 | 6/1963 | Smith | 30—15.5 |
| 3,189,995 | 6/1965 | Hicks et al. | 30—6.4 |
| 3,216,108 | 11/1965 | Jepson et al. | 30—4 |

WILLIAM FELDMAN, *Primary Examiner.*

G. WEILDENFELD, *Assistant Examiner.*